United States Patent [19]

Mannik

[11] Patent Number: 5,402,109

[45] Date of Patent: Mar. 28, 1995

[54] SLEEP PREVENTION DEVICE FOR AUTOMOBILE DRIVERS

[76] Inventor: Kallis H. Mannik, P.O. Box 43, Webster, N.Y. 14580

[21] Appl. No.: 54,224

[22] Filed: Apr. 29, 1993

[51] Int. Cl.⁶ .............................................. G08B 23/00
[52] U.S. Cl. .................................. 340/575; 340/576; 351/210
[58] Field of Search .................. 340/575, 576, 573; 128/745, 780, 782, 733; 351/209, 210

[56] References Cited

U.S. PATENT DOCUMENTS

| | | | |
|---|---|---|---|
| 4,144,531 | 3/1979 | Anbergen | 340/575 |
| 4,875,030 | 10/1989 | Chiu | 340/575 |
| 4,967,186 | 10/1990 | Ludmirsky et al. | 340/575 |

*Primary Examiner*—Jeffery A. Hofsass
*Assistant Examiner*—Benjamin C. Lee

[57] ABSTRACT

This invention is an eyeglass attachable alarm signal device for automobile and truck drivers, preventing them to fall asleep, while driving. It is designed both for daytime and for nighttime driving. A beam of a narrow-band light of any color is used for optical sensing, whether the driver's eyelids are closed or are in an open position. The use of infrared light is preferred, because infrared light generates least distraction to the driver. A tiny slide-adjustable light emitter carrier, sliding along the eyeglass temple, is used for positioning the light emitter on the eyeglass properly for each driver. A narrow-band light beam from this emitter is aimed across the surface of the driver's eye, just above the eyeball, between the eyelids, and it is sensed in the opposite corner of the eye by means of a light sensor, which has a narrow band light filter mounted in front of it. For infrared light preferably the Kodak's Wratten filter #87 or #87 C is used. For waking up the driver, whose eyes have been closed for a longer time period than about one second or less, an electronic circuitry is activated by means of the closed-eye signal from the light sensor, turning on an alarm signal, a buzzer or similar, after a one second or shorter time delay.

9 Claims, 8 Drawing Sheets

SLEEP PREVENTION DEVICE FOR AUTOMOBILE DRIVERS

BACKGROUND OF THE INVENTION.

The prior art solutions for driver wake-up devices have been either analyzing the infrared light reflection from the eye fundus or eyelid to detect the level of the driver's fatigue or analyzing the movements of driver's eyelashes, to generate the wake-up signals for drivers. To use eyelashes for analyzing the eye movements of the driver are too critical. Eyelashes are too whimsical for an optical system. Eyelashes can be dark, blond, thick or thin. Therefore none of these sleep preventing devices have been working, nor have been marketed so far in USA.

The present invention distinguish from these previous art solutions, in that the lightbeam according to the present invention is interrupted by the movements of the eyelid, instead for being interrupted by the movements of eyelashes.

The present invention is a sleep-preventing device for an automblie driver, for day- and night-time driving, generating an alarm signal, whenever the eyes of the driver have been closed for a longer time period than a second.

The present invention distinguish also from previous sleep prevention devices, because the positioning of the emitter is smoothly adjustable in tiny increments along the temple of the eyeglasses.

The present invention is different from previous driver-wake-up devices, because narrow-band emitter light is used and a narrow band filter is positioned in front of the photosensor, to prevent the ambient light from all the other frequencies from interfering with the optics of the sensing system, according to this invention.

The present invention distinguishes from previous inventions, because in electronic circuitry, instead of a regular resistor as a balancing circuit element for the photosensor, a cadmium-sulfide photocell (which has resistivity, which is decreasing with increased illumination) is used for eliminating the ambient light effect to the photocell circuitry.

In an other embodiment of this invention it is used a pulsating light source, in order to addittionally diminish the influence of ambient light variations to the optical system according to this invention.

For daytime driving, according to the present invention, this sleep-preventing device has to have an infrared light reflecting coating on the eyeglasses and a light shield mounted to an eyeglass temple, behind the emitter, to prevent direct sunlight from falling onto the photosensor.

It seems, that none of the previous inventors have proceeded into practical application of this sleep-preventing device, involving the influence of daylight and ambient light to the optical system of these sleep preventing devices.

The device, according to the current invention is working as designed and has been already reduced to practice for night-time and for day-time driving.

Some prior art solutions by other inventors, who are looking at the movements of the eyelashes, are as follows.

In U.S. Pat. No. 2,726,380, inventor H. A. Campisi states on lines 56 to 63 in the description of his invention: "The so-established collimated light beam developed by the light source is directed between the bow of the spectacles and the nosepiece so as to traverse a path close enough to the operator's eyes that the eyelashes, during winking or nictation, cause this light path to be eclipsed or intercepted and interrupt the light rays which otherwise would be directed into the light responsive cell." FIG. 1 of U.S. Pat. No. 2,726,380 shows the light beam being emitted from a light source and received by a photocell and intercepting eyelashes.

In U.S. Pat. No. 4,875,030 inventor Chio states, in his Detailed Descripion of Preferred Embodiments, on lines 25 to 33 "It should be noted a normal blink usually causes no more than 0.3 miliseconds of stay of the eyelashes at its lowest position where beam passes. Thus such a transient interruption of illumination on the photo-diode 2 does not cause any response. However, if the break of illumination exceeds the upper limit of time of a human's natural blink, the alarm device will be triggered to actuate the buzzer 3 to produce an acoustic alarm". Thus he says, that a longer stay of eyelashes at its lowest position where the beam passes eyelashes, gives alarm evidence and it produces an acoustic alarm.

In U.S. Pat. No. 4,144,5531 inventor Arnberger states in the Abstract of the Invention: A safety apparatus for detecting an individual becoming drowsy is provided comprising a wave emitter mounted on an eyeglasslike frame for emitting a wave along a path directed to pass close to the individual's eyeball without impinging the latter that said wave is interrupted by the eyelashes when the eyelid is quivering, and detecting means on the frame for generating a signal in response to the wave being interrupted". FIG. 2 in the same U.S. Pat. No. 4,144,531 shows the sensing light beam and shows the eyelashes of the driver's left eye interrupting that light beam.

SUMMARY OF THE INVENTION

Many serious accidents occur on U.S. highways because the car drivers very often fall asleep while driving a car. Attempts have been made to design a device which will wake up a driver, while he/she is falling asleep, and his/her head is nicking down. But often only the driver's eyes close, while his/her head does not change position. The current invention is a comprehensive detector device which detects the moment when the driver of a car is beginning to fall asleep by means of determining the exact moment when his/her eyes are closing. The closing of the eyes is detected with a device consisting of a single color light source, preferably an infrared light source, and of a single color light sensing or infrared light sensing detector with an electronic circuitry, which analyzes eyelid movements of the driver. For determining the eyelid on-off position, a narrow light beam from an infrared light emitter or from a single color light source, placed in one end of the eye is directed through the narrow channel between the eyelids just above the surface of the eye, to the light sensitive detector, placed at the other end of the eye. This light sensitive detector has an infrared Wratten filter or a bandpass filter for colored light in front of it placed in the incoming light beam path. When the driver's eyes are open, the infrared light detector or the colored light detector detects the presence of infrared light or colored light. Whenever the driver's eyes are closed, the eyelids are in the path of the light beam emitted from the emitter and the light detector sees no light.

The infrared light or a single color light source is used, because if a narrow band light were not used, the ambient (multicolor=white) light would smother completely the eye close/open signal during the daylight hours and this invention could be used only for nighttime driving, and be worthless during daytime driving.

The driver's eyelids closed/open position can be determined in two different ways, according to two different embodiments of this invention. These two embodiments are shown in FIG. 1 and in FIG. 15.

A) According to the first embodiment of this invention, a narrow light beam of infrared light from an infrared light emitter, placed in one side of the eye of the driver, is directed through the narrow channel between the eyelids just above the surface of the eye, to an infrared light detector, placed close to the other side of the eye. When the driver's eyes are open, the infrared light detector detects the presence of infrared light. When the driver's eyes are closed, the eyelids are in the path of the infrared light-beam, emitted from the emitter and the detector sees no light, thus activating the alarm.

B) According to the second embodiment of the invention, a narrow light beam of infrared light from the emitter, placed in one end of the eye of the driver, is directed to the other end of the eye through the narrow channel between the eyelids just above the surface of the eye.

A tiny mirror or a tiny disc of a reflective tape is placed close to the other end of the eye. This mirror or the reflective tape reflects the infrared light-beam through an infrared light filter (for ex. Wratten Filter nr.87) onto an infrared light detector, which is mounted in close proximity to the infrared light emitter. When the driver's eyes are open, the infrared light detector detects the presence of infrared light. When the driver's eyes are closed, the eyelids are in the path of the light-beam, emitted from the emitter and the detector sees no light, thus activating the alarm.

The purpose for mounting an infrared Wratten filter nr 87 or 87C or similar in front of the infrared light sensor is to eliminate or reduce drastically the influence of ambient light. In case a colored light source is used, then the filter in front of the photocell will be a narrow-band bandpass filter of the same color as the light which is used, in order to reduce the smothering effect of multicolor (white) ambient light.

These two embodiments of this invention describe how this invention works with infrared light. But this invention works as well, when a narrow band visible light of any color is used.

The driver wake-up device according to the present invention can be mounted either to the left or right side of drivers eyeglasses.

DESCRIPTION OF THE PREFERRED EMBODIMENT.

In order to provide improved driving safety, there is a need to keep car drivers alert, thus preventing serious highway accidents caused by drivers who are falling asleep while driving. Drivers sometimes use coffee, tea or Nodoz tablets containing caffeine to keep them alert. A brief stop in a thruway service area and a nap of 15–20 minutes can restore alertness. But nevertheless, there can be times when a driver believes that he or she is alert enough for driving, but still falls asleep while driving. The proposed invention is for eliminating the possibility of a driver falling asleep while driving.

Figure 1:
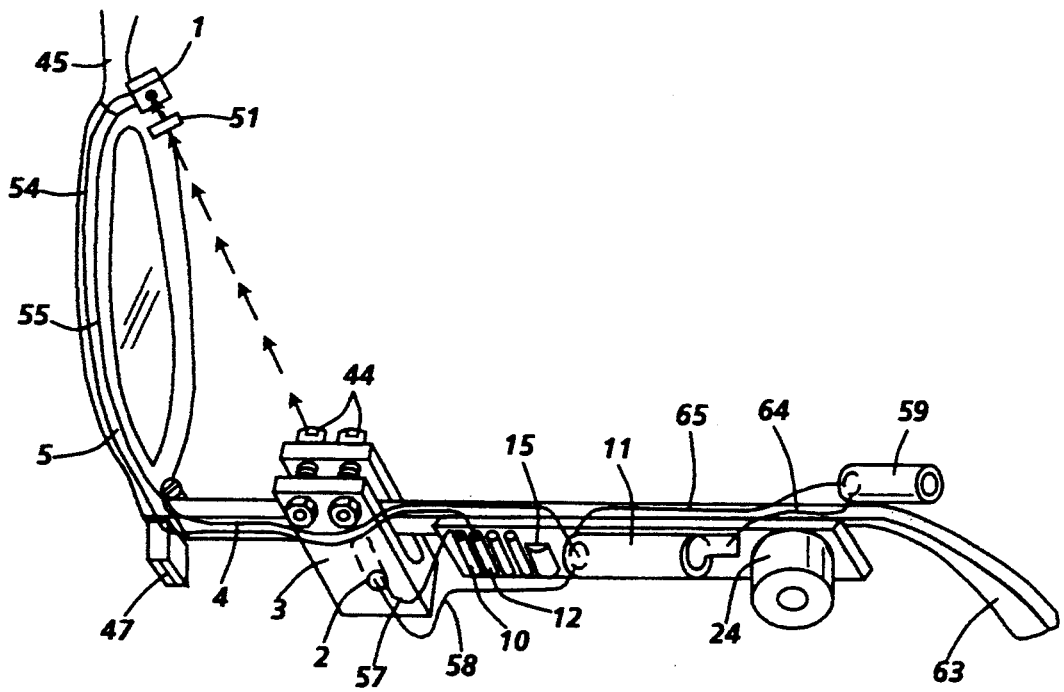
FIG. 1 is a perspective view of the sleep-preventing alarm device attached to a pair of regular eye-glasses in accordance with a preferred embodiment of present invention.

This invention, according to the first embodiment shown in FIG. 1, consists of an infrared or visible light sensor 1, FIG. 1 mounted on an eyeglass frame 5 at one side of the drivers eye, for example near the inside corner of the driver's eye and of an infrared or visible light emitter 2, FIG. 1 mounted at the opposite side of the driver's eye on a slide adjustable mount 3, FIG. 1, movable along the temple 4 of the eyeglass 5, FIG. 1.

Figure 2:
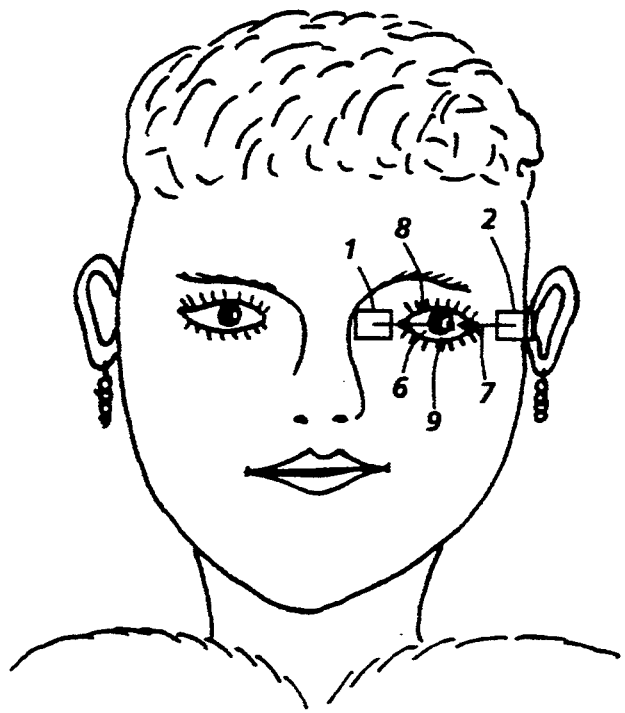
FIG. 2 shows the approximate positions of the narrow band light emitter and the light sensor in relation to the drivers eye.
Figure 3:
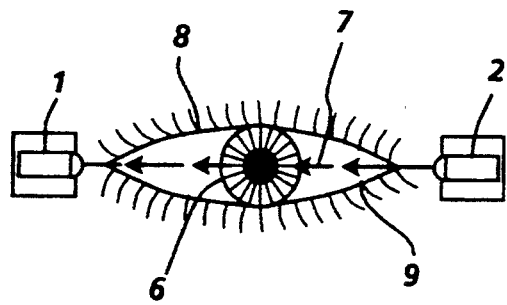
FIG. 3 is a view of the drivers eye, when the driver's eyes are open.
Figure 4:
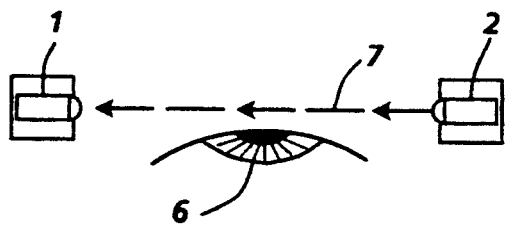
FIG. 4 is a horizontal cross section of the drivers eye, when the driver's eyes are open.
Figure 5:
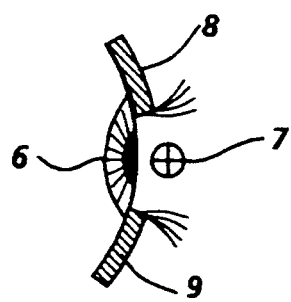
FIG. 5 is a vertical cross-sectional view of the drivers eye, showing the approximate position where the light beam is passing the eye, when the driver's eyes are open.

This emitter 2 and this sensor 1 are mounted in such a way, that the infrared or visible narrow band light from the emitter 2, when driver's eyes are open, is directed in a narrow beeam 7, between the driver's upper eyelid 8, FIG. 2, FIG. 3, and FIG. 5 and the driver's lower eyelid 9, FIG. 2, FIG. 3 and FIG. 5, onto the sensor 1, FIG. 1, FIG. 2, FIG. 3, FIG. 4 and FIG. 6; this beam 7 as shown in FIG. 4 and FIG. 5, passes just above the surface of the driver's eye 6, FIG. 4 and FIG. 5, when the eyes of the driver are open.

Figure 6:
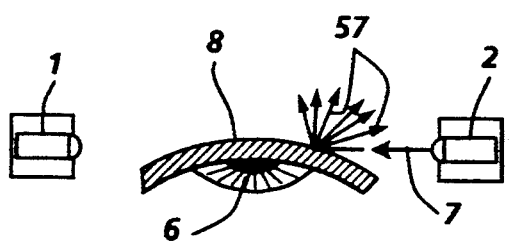
FIG. 6 is a horizontal cross-sectional view of the drivers eye, when the eyes of the driver are closed. This view shows how the eyelid prevents the light from the emitter from reaching the light detector.

In the FIG. 2 are shown the approximate positions of the infrared or narrow band visible light emitter 2 and the infrared or visible light detector 1 in relation to the drivers eye. In FIG. 3 it is shown a driver's eye 6, while it is open, in a front view, in FIG. 4 is shown the open driver's eye 6 in a side wiev and in FIG. 5 it is shown a a cross section of the driver's eye 6, while it is open. In FIG. 6 it is shown the driver's eye 6, while it is closed.

Figure 7:
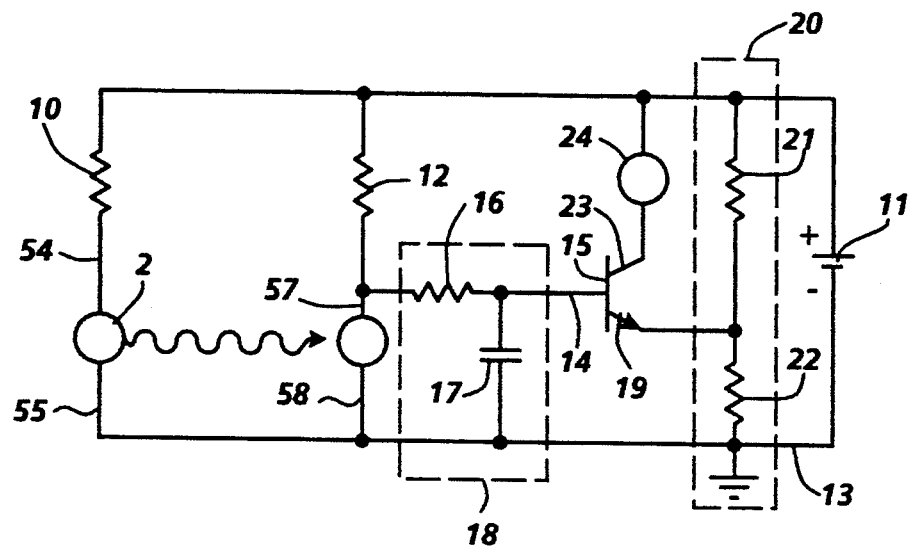
FIG. 7 shows a simple electronic circuitry for this sleep-preventing alarm device, employing a simple NPN transistor-driven buzzer to generate a wake-up alarm signal.

The eye movements depending variation in detected infrared or visible light level is caused by the fact,that as shown in FIG. 2, in FIG. 3, in FIG. 4 and in FIG. 5 the full amount of infrared or visible light is received by the sensor 1, when the eyes of the driver are open but considerably less light is received by the sensor 1, when the eyes of the driver are closed, as shown in FIG. 6, because his/her upper eyelid 8 which is in the light beam 7 path, is preventing the infrared or visible light from the infrared or visible light source 2 from falling onto the light sensor 1. The light from the emitter gets scattered, 57 FIG. 6, when it hits the closed eyelid 8. The variation in detected light is converted into an electrical signal which activates an audible alarm-signal device when the driver's eyes have been closed for a period of time, longer than 1 second. Normal blinking of the eyes doesn't activate this alarm device. The simplest necessary electronic circuitry is shown in FIG. 7. The light detector 1, mounted close to the bridge part 45 of the eyeglasses 5, as shown in FIG. 1, is connected with two wires 54 and 55, which are attached to the eyeglass frame 5 and to the electronic alarm generating circuit as shown in FIGS. 1 and 7. The light emitter 2, mounted on a slide 3 on one of the temples 4 of the eyeglasses as shown in FIG. 1, is connected with two wires 57 and 58 to the electronic alarm generating circuitry, shown in FIGS. 1 and 7. This circuitry has a simple RC delay circuitry 18, FIG. 7, consisting of a resistor 16 and of a capacitor 17. A more sophisticated circuitry is shown in FIG. 9 which has a monostable IC #555 to generate an one second delay, before the alarm signal is activated.

In the circuitry according to FIG. 7, an infrared or a narrow band visible light emitter 2 is powered by a battery 11 across a resistor 10. The other terminal of this resistor is connected to the ground 13.

Figure 8:
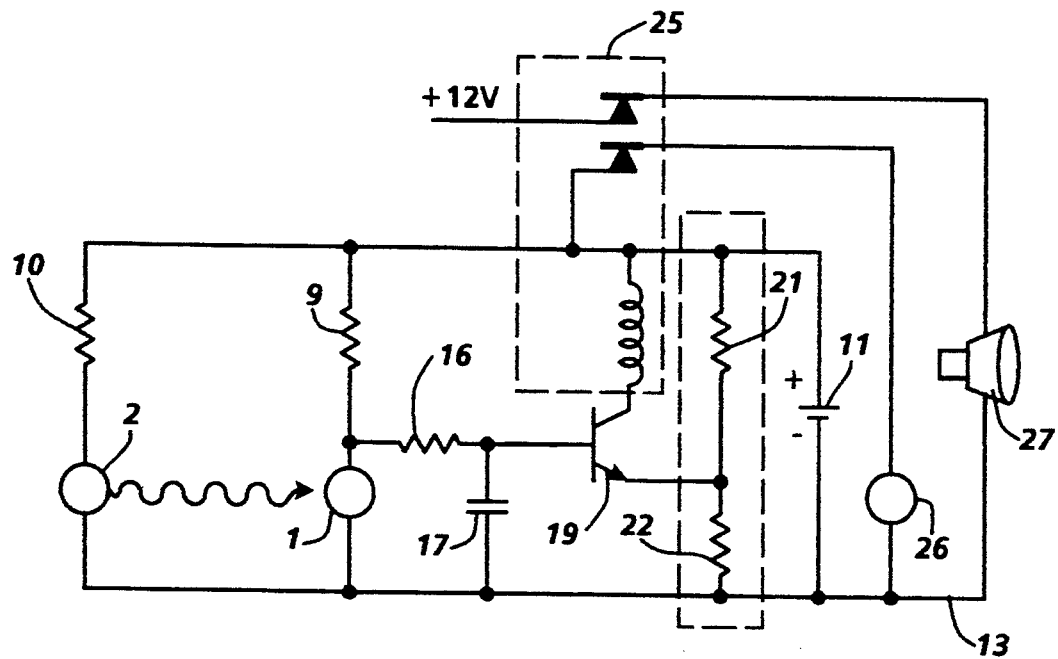
FIG. 8 shows the same electronic circuitry, only with the buzzer being replaced with a relay, which can actuate a more powerful noise generator or which can also actuate the car horn.

The light from this infrared or visible narrow band light emitter 2 is received by means of a light detector 1, which is connected to the battery, 11, across a resistor 12. The other terminal of this detector is connected to the ground 13. The output of this light-detector 1 is connected to the base of a regular NPN transistor 15, across a resistor 16. The base of this NPN transistor is also connected to a capacitor 17. The other terminal of that capacitor is connected to the ground 13. The emitter 19 of this NPN transistor is connected to a voltage divider 20 consisting of resistors 21 and 22, which generates at emitter terminal 19 a certain bias potential. The collector lead, 23, of this NPN transistor 15 is connected to a buzzer 24. The other end of this buzzer is connected to the (+) terminal of the battery, 11. Instead of a buzzer 24, a relay 25 can be inserted into the collector lead, as shown in FIG. 8, which will then connect a more powerful alarm signal generator 26 into the circuitry or which can connect the car horn 27, into the circuitry.

Figure 9:
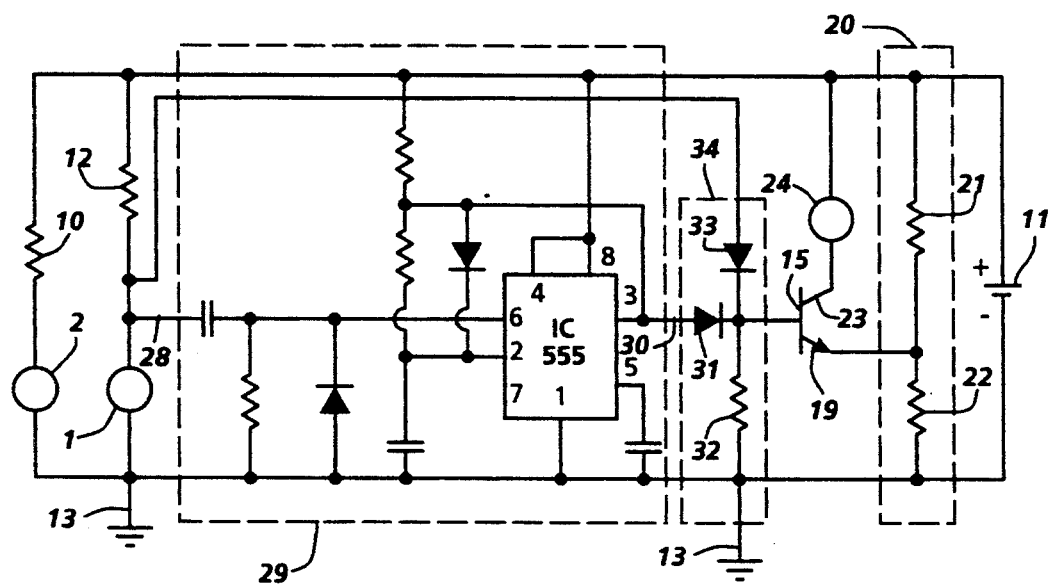
FIG. 9 shows an electronic circuitry for this sleep-preventing device, which has a delay pulse circuitry incorporated, in order to delay the alarm signal start approximately one second after the driver's eyes have been closed.

In the circuitry shown in FIG. 9 an infrared or a narrow band visible light e emitter is powered by means of a battery 11. It is connected to the battery with a resistor 10. The infrared or a narrow band visible light from this light emitter 2 is received by means of an infrared light detector 1, which is connected to this battery 11, across a resistor 12. The other terminal of this detector is connected to the ground 13. The output of this light detector 1 is connected to the input lead 28 of an IC #555, which is wired as a monostable one shot multivibrator 29, FIG. 9, generating an one second lasting negative pulse at its output lead, for every psitive pulse at its input lead 28.

The output lead 30 of this IC #555 is connected to a diode 31. The other terminal of this diode is connected to a resistor 32. The other end of this resistor is connected to ground 13. This resistor is also connected to the output of the photocell 1 across a diode 33. These two diodes constitute an AND circuitry 34. The voltage across the resistor 32 is high only if the voltage inputs to both diodes 31 and 33 are high. When the car driver's eyes close, the eye closing signal activates the one shot multivibrator 29 for one second. In case after this one second time interval the driver's eyes are still closed, then the voltage across the resistor 32 will be high and transistor 15 will be turned on, and it will activate the buzzer 24, which generates a wake-up signal to the driver. Any other kind of a similar circuitry can be used, this doesn't change the content of this invention.

Figure 10:
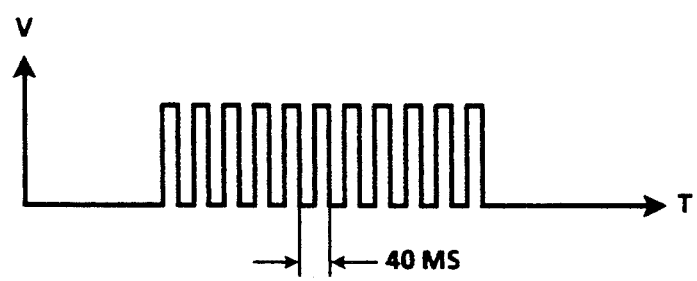
FIG. 10 shows a time diagram of the voltage with frequency about 250 cycle/sec, which is generated by means of an astable multivibrator IC#555, shown in FIG. 11 This voltage is used to generate pulsating light output from the emitter 2, shown in FIG. 11.
Figure 11:
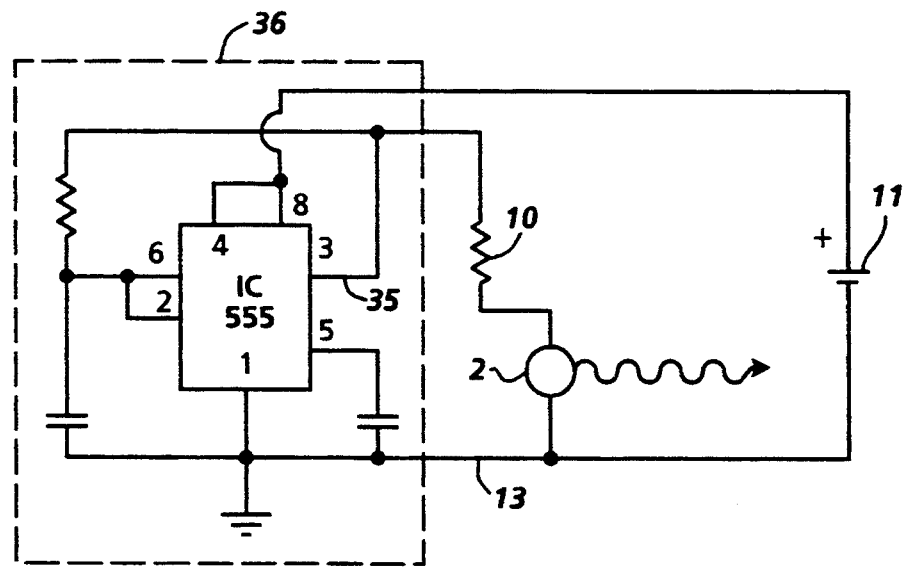
Figure 12:
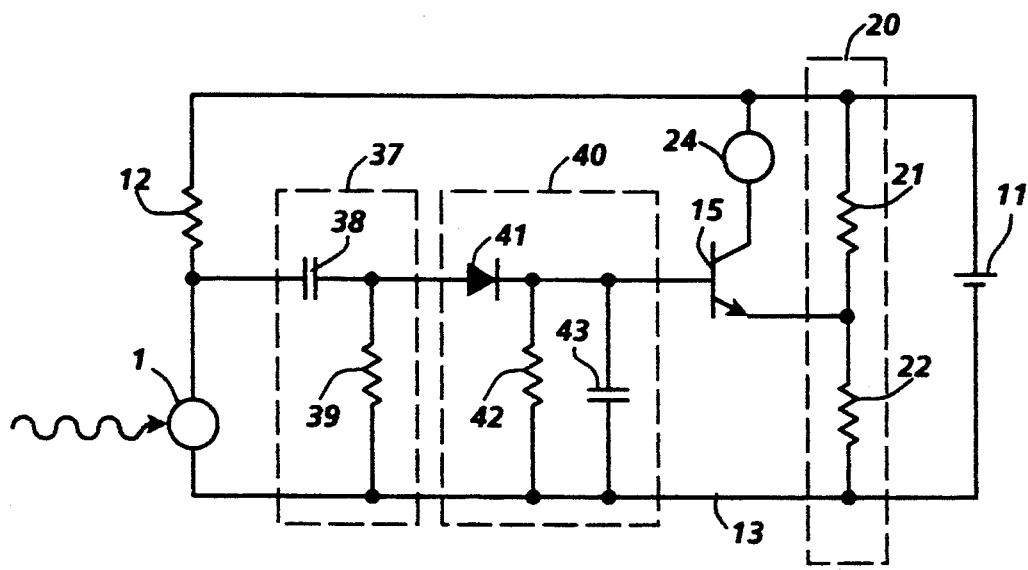
FIG. 12 shows the electronic circuitry, which is needed to receive this pulsating eye close/open signal, and convert it to an alarm signal.

In order to eliminate completely the effect of ambient stray light variation to the electronic circuitry of this invention, the infrared or visible light from emitter 2, FIGS. 1, 2, 3, 4, 6, 11 14,1 5,16, 18 and 19 or from some other light source, can be arranged to pulsate at some selected frequency, for example at 250 cycle/sec as shown in FIG. 10. An infrared light emitter, a colored light emitting diode (LED) or any kind of white light source, has to be, in this case connected to the output of a timer IC #555 circuitry 36, FIG. 11, across the resistor 10, FIG. 11. The photo detector 1 circuitry in this case must have an RC-filter circuitry 37 (consisting of a capacitor 38 and of a resistor 39), at its input, shown in FIG. 12, which eliminates all frequencies which are lower than the pulsating frequency of the emittor light, and which allows only the pulsating frequency electrical signals of the infrared or visible light to pass through. Also a modulator/detector circuitry 40 (consisting of a diode 41 of a resistor 42 and of a capacitor 43), is needed, to convert the received pulsating signals into the desired eye movements describing electrical signals. The rest of the circuitry is the same as shown in FIG. 7.

Figure 13:
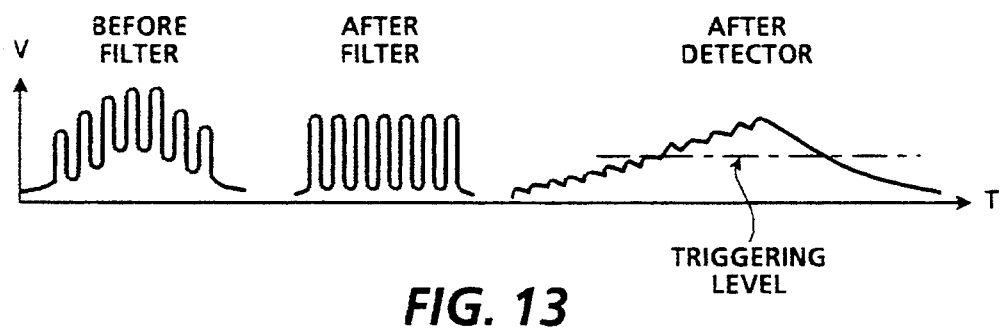
FIG. 13 shows how this signal changes, while it passes the electronic circuitry according to FIG. 12.

The conversion of the pulsating input signals into eye movements describing signals is shown graphically in FIG. 13.

Figure 14:
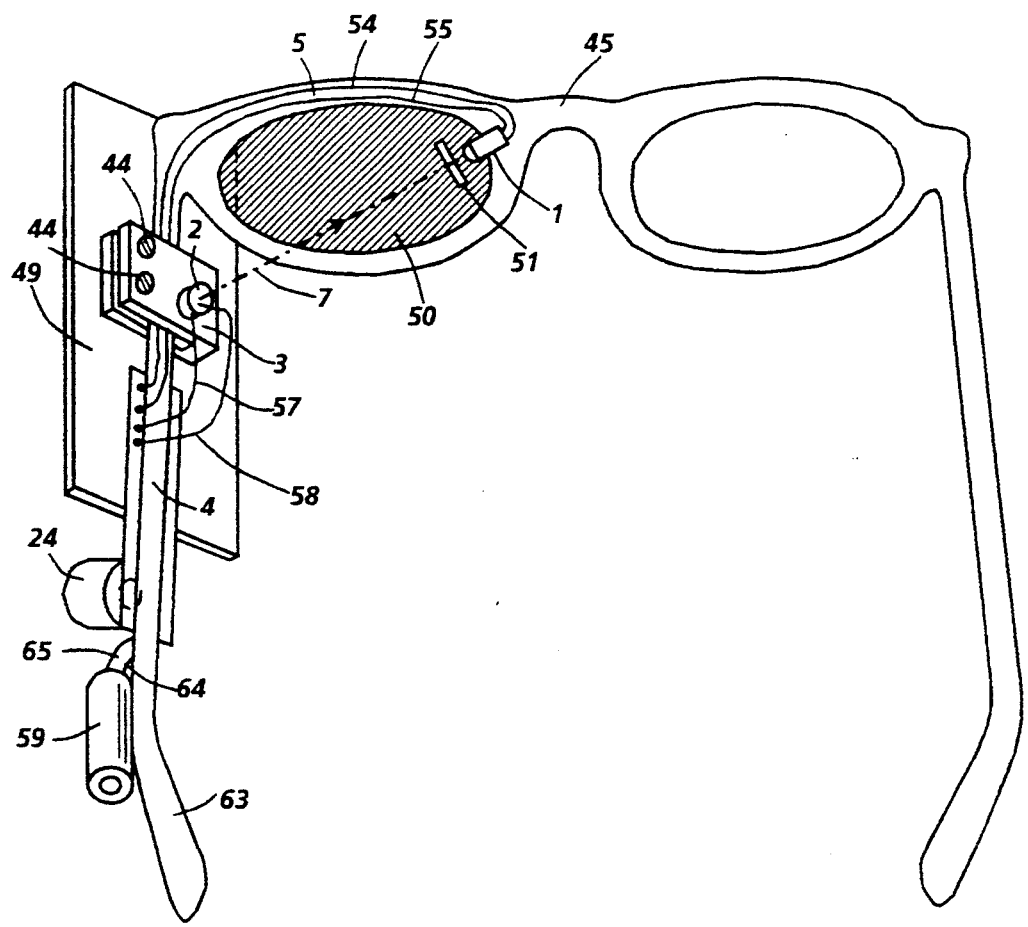
FIG. 14 is a perspective view of the sleep-preventing alarm device, attached to a pair of regular eyeglasses which have a heat-reflective coating on the surface and a shield behind the emitter-side of the eyeglasses, to prevent bright daylight and sunshine to interfere with wake-up signals during daytime driving.
Figure 15:
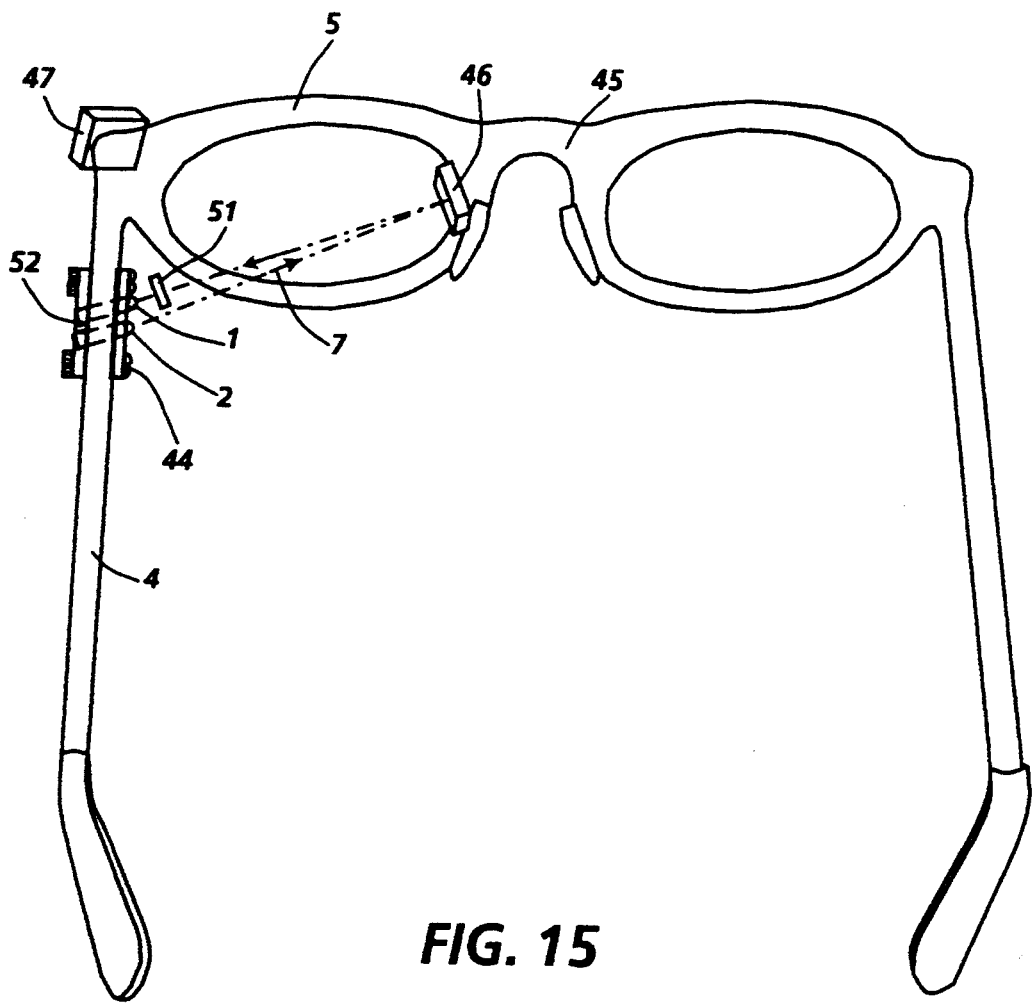
FIG. 15 is a perspective view of the sleep-preventing alarm device, attached to a pair of regular eyeglasses according to another embodiment of the present invention.

The infrared or visible narrow band light emitter 2, FIG. 1, the light sensor 1, FIG. 1 and the necessary electronics, shown in FIGS. 7,8, 9, 11, 12 and 19, with a battery 11 and with an alarm signal device 24 for these driver's wake-up devices can easily be mounted onto conventional eyeglasses 5 as shown in FIGS. 1, 14 and 15. Modern electronic components are very tiny, lightweight and don't take up too much space.

Figure 19:
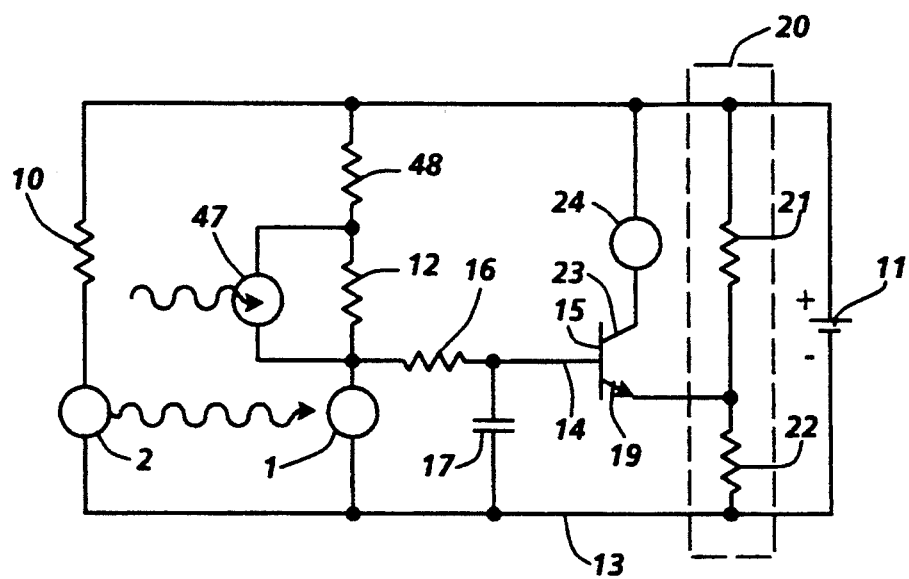
FIG. 19 shows an electronic circuitry for this sleep-preventing device, which uses a cadmium sulfide photocell as part of the balancing resistor for a photodetector, to compensate for the ambient light variations during daytime driving.

Instead of a battery 11, the electronic circuits in FIG. 7, FIG. 8, FIG. 9, FIG. 11, FIG. 12 and in FIG. 19, can be powered with the car's battery, by means of an accessory power plug, inserted into the car's cigarette lighter's outlet. This accessory power plug will be connected with the device by means of a two-wire cable, terminated with a cable connector, which will be inserted into the matching cable connector 59, shown in FIGS. 1 and 14.

The main invention component, the infrared light emitter or the visible narrow band light emitter 2, FIGS. 1 and 14 has to be slide adjusted to its optimum position on an eyeglass temple, 4 FIG. 1 and FIG. 14 for every driver.

Therefore a tiny sliding block 3, shown in FIG. 1 and in FIG. 14, carrying the emitter 2, is made slide-adjustable along the eyeglass temple, 4, FIG. 1 and FIG. 14

This emitter carrying block 3, FIG. 1 and FIG. 14, is slide adjusted into its optimum position for each individual person who is using a device according to this invention, because of differences in eye positions of each driver.

After this adjustment is made, this tiny block 3 with the emitter 2 in it will be locked into its correct position with a screw, 44, FIG. 1 and FIG. 14, with a clamp, with glue or with some other fastening means.

Similarly the visible colored light detector or the infrared light detector 1 has to be locked into its position on the eyeglass frame 5, FIG. 1 and FIG. 14, with glue, with screw, with double adhesive tape or by some other means, after it is adjusted into its optimal position, close to the bridge part 45 of the eyeglass frame 5, close to the corner of the eye of the car driver.

According to another embodiment of this invention, shown in FIG. 15, a tiny sliding block 52, FIG. 15, movable along the temple 4 of the eyeglasses, carries both the infrared light emitter 2 and the infrared light detector 1, mounted in close proximity to each other on this tiny sliding block 52.

Figure 16:
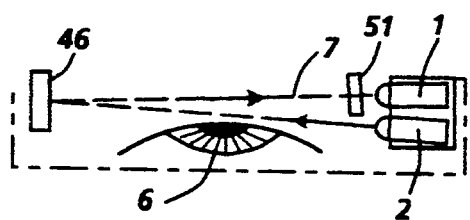
FIG. 16 is a horizontal cross sectional view of the driver's eye, while the driver's eyes are open.
Figure 17:
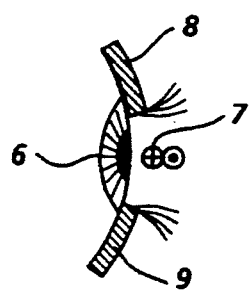
FIG. 17 is a vertical cross sectional view of the drivers eye showing the approximate position, where the light beam and the returning light beam are passing the eye, while the driver's eyes are open.

According to this embodiment of the invention, at the opposite corner of the eye attached to the eyeglasses 5 close to the bridge 45 of the eyeglasses, there is a tiny mirror 46 attached, which is reflecting the visible light or infrared light from the emitter 2 back to the detector 1, in a light path 7 shown in FIG. 15, FIG. 16 and in FIG. 17, between the driver's upper eyelid 8 and the lower eyelid, FIG. 17, just above the surface of the driver's eye 6, when the eyes of the driver are open.

Figure 18:
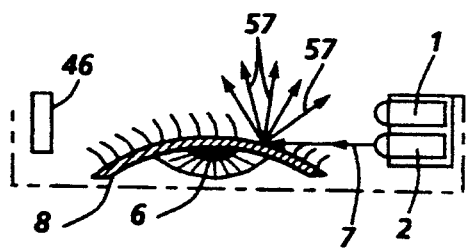
FIG. 18 is a horizontal cross sectional view of the driver's eye, while the driver's eyes are closed. The light from the light emitter doesn't reach the reflecting mirror, instead it is scattered as a result of hitting the drivers closed eyelid.

When the eyes of the driver are closed, as shown in FIG. 18, the upper eyelid 8 prevents the light beam 7 from reaching the mirror 46, the light gets scattered, 57, FIG. 18 while hitting the upper eyelid's 8 surface, and the light detector 1 sees only the low level background light. The electronic circuits for this embodiment of the invention are the same as shown in FIG. 7, FIG. 8, FIG. 9, FIG. 11, FIG. 12 and in FIG. 19.

Alternately reflective tape can be used to reflect the emitted light back to the light sensor in the same way as it is done by means of using a mirror.

In order to compensate for the ambient light variations during daytime driving a large part of the balancing resistor 12 for the photocell, 1 FIG. 7 is replaced with a cadmium sulfide photocell 47, FIG. 1, FIG. 15 and FIG. 19, pointing toward the ambient light in front of the eyeglasses 5, as shown in FIG. 1. and i FIG. 15.

The electronic circuitry using this variable resistance cadmium sulfide photocell 47, is shown in FIG. 19. The resistance of a cadmium photocell increases in darkness and decreases with increasing ambient light. In the circuitry, shown in FIG. 19, this cadmium fulfide photocell is parallel coupled with a resistor 12 and series coupled with a resistor 48, in order to obtain optimum balancing effect.

Previous inventors have used all wavelengths white light in the optical system of their sleep-preventing devices. Present invention uses limited wavelengths light: a narrow band colored light, consisting of light frequencies only of limited part of the visible light spectrum, or of an infrarfed light band or of a ultravieolet light band. In order more efficiently limit the ambient light's effect to the photosensor. In front of the photosensor is mounted an infrared Kodak Wratten Filter #87, 87 C or similar 51, FIG. 1. FIG. 14 and FIG. 15, in case an ifrared light emitter is used.

In case colored light is used, a narrow band color filter which is properly matched to the wavelengths of the emitters colored light, has to be mounted in front of the photosensor.

In case a car driver is driving a car in full daylight and in full sunshine, and still wants to use this sleep prevention device, the eyeglasses have to have an opaque light shield 49, FIG. 14 attached to the temple 4 behind the emitter 2 as shown in FIG. 14 and have eyeglasses coated with a coating 50, FIG. 14, similar to the coating of Blue-Green Eclipse Glass from LOF, by Cite des Vins, Bordeaux France (owner), manufactured in France, Epinol by Facior. The United States representative for this specially treated heat reflecting glass is: Libby Owens Ford Corporation. Instead of reflective coating on the eyeglasses a circular clip-on discs of this Blue-Green Eclipse Glass from LOF, attached to the eyeglasses, can be used.

Also instead of the opaque light shield 49, FIG. 14, a transparent light shield of the above described Blue-Green Eclipse Reflecting glass or similar can be used.

While driving against low evening or morning sunshine, the driver's side sunvisor has to be lowered enough to prevent the direct sunshine to interfere with the optical system of this invention.

Figure 20:
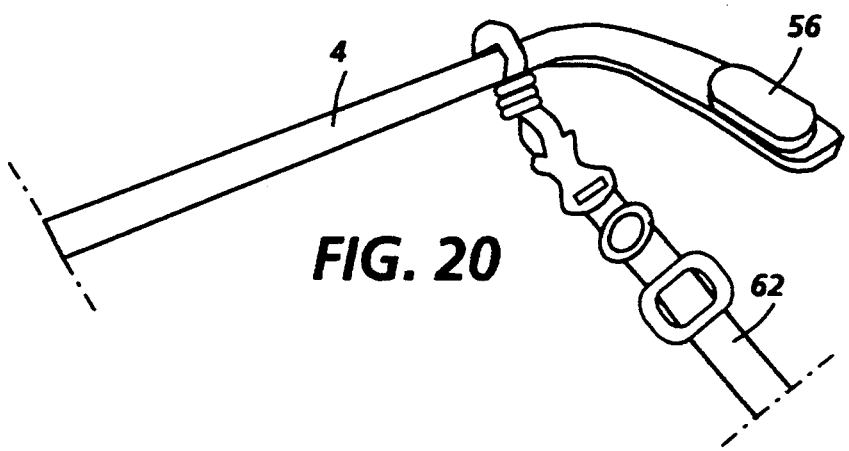
FIG. 20 shows a temple pad on the temple of an eyeglass and also an elastic strap, which is needed to hold this sleep-preventing alarm device in stable operational position, while driving.
Figure 21:
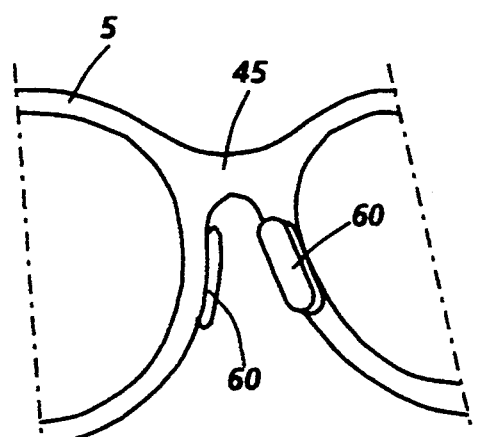
FIG. 21 shows nose pads, which must be used to prevent eye-glasses from sliding down along the nose, thus holding this sleep-preventing alarm device in a stable operational position, while driving.

It is very important, to hold this sleep-preventing alarm device in a stable operating position all the time, while driving, therefore temple pads 56, FIG. 20 and nose pads 60, FIG. 21 have to be ued with eyeglasses. Also an elastic band 62, FIG. 20, connecting the left temple with the right temple, should be used for the same reason, to keep this alarm device in a stable operating position all the time.

For checking the strength of the battery, the driver can look briefly downward, without turning his head downward. This brief downward look will generate a strong or a weak "peep" signal fom the buzzer, indicating whether the battery has to be replaced or not. When the driver looks down at the dashboard, while turning his head also downward, no alarm signal will be generated. When the driver looks out through the left side window, while turning his head in the same direction, no alarm signal will be generated.

A driver, who doesn't want to use batteries for this alarm signal device, can use the car battery to power the electronics circuitry of this device, by simply inserting an accessory power plug into the cigarette lighter on the car's dashboard.

What is claimed is:

1. An automobile driver sleep-preventing device for use with a pair of driver's eyeglasses, said device comprising:
   light emitter and oscillator means for emitting a narrow bandwidth of pulsating light beam;
   slide adjustable mounting means for mounting said emitter and oscillating means on the temple of said eyeglasses, such that said pulsating light beam traverses one of the driver's eyes just above the surface of the eye and between the upper and lower eyelids while the driver's eye is opened;
   light detector means, receiving full amount of said pulsating light beam when the driver's eye is opened, and receiving reduced ambient scattered light when the driver's eye is closed, for outputting electrical signals characteristic of received pulsating light beam and ambient scattered light;
   narrow band filter means for eliminating electrical signals characteristic of said ambient scattered light and passing electrical signals characteristic of said pulsating light beam;
   eletronic alarm signal generating circuitry for receiving said electrical signals of said pulsating light beam, detecting input light variations, and converting said input light variations into an alarm signal when said driver's eye is closed;
   ambient light influence reducing means consisting of a photocell for further reducing ambient light influence, which is incorporated into the electronic alarm signal generating cirucitry as a negative light-resistance element by means of being coupled in series with a resistor and with the light detector between plus and minus leads of a power source;
   said power source also connected to said light emitter and oscillator means;
   heat reflecting means in front of the eyeglasses in order to reduce the effect of bright sunshine during day-time driving;
   acoustic alarm generator, triggered by said alarm signal for producing an alarm for waking up the driver;
   friction means for holding the eyeglasses in a stable position which include:
      nose-pads; temple pads; and an eleastic band extending from temple to temple of the eyeglasses.

2. An automobile driver sleep-preventing device according to claim 1, wherein said photocell is a cadmium sulfide photocell.

3. An automobile driver sleep-preventing device according to claim 1, wherein the electronic alarm signal generating circuitry comprises:
   an RC circuit;
   an NPN transistor;
   a voltage divider;
   a relay with coil and contacts;
   a buzzer as the acoustic alarm generator;
   wherein output of the detector means connects via the RC circuit to the base of the NPN transistor; the voltage divider connected to the emitter of the NPN transistor; the coil of the relay connected to the collector of the NPN transistor; and the relay contacts connected to the buzzer; for genenerating approximately a one second time delay by said RC circuit before said buzzer sounds.

4. An automobile driver sleep-preventing device according to claim 3, wherein said acoustic alarm generator is the car horn of the automobile.

5. An automobile driver sleep-preventing device according to claim 1, wherein said electronic alarm signal generating circuitry comprises:
   a one shot pulse generator;
   a first diode;
   a circuit formed by a resistor connected in parallel with a second diode;
   for generating said alarm signal only when said driver's eye is closed for longer than approximately one second;
   wherein said one shot pulse generator is connected to the output of the light detector and via said first diode to the base of said NPN transistor; and said circuit formed by the resistor connected in parallel with said second diode is connecting in parallel with the output of the light detector and said base of said NPN transistor, so that said first diode and said circuit formed by the resistor connected in parallel with said second diode together form an AND logic gate.

6. An automobile driver sleep-preventing device according to claim 1, wherein said oscillator means comprises:
   an astable Integrated Circuit #555; and wherein said narrow band filter means comprises:
   an RC band-pass circuit.

7. An automobile driver sleep-preventing device according to claim 1, further including:
   mounting means for mounting electronic components other than said light detector onto said temple of said eyeglasses, including:
      screws, glue, double-stick tape, velcro mount, and clamps.

8. An automobile driver sleep preventing device according to claim 1, wherein said power source is a battery.

9. An automobile driver sleep-preventing device according to claim 1, wherein said power source consisting of an accessory power plug for insertion into the cigarette lighter outlet of said automobile.

* * * * *